Feb. 26, 1957 V. E. MATULAITIS 2,783,411
SERVO FEED FOR MULTIPLE ELECTRODES
Filed Dec. 9, 1955
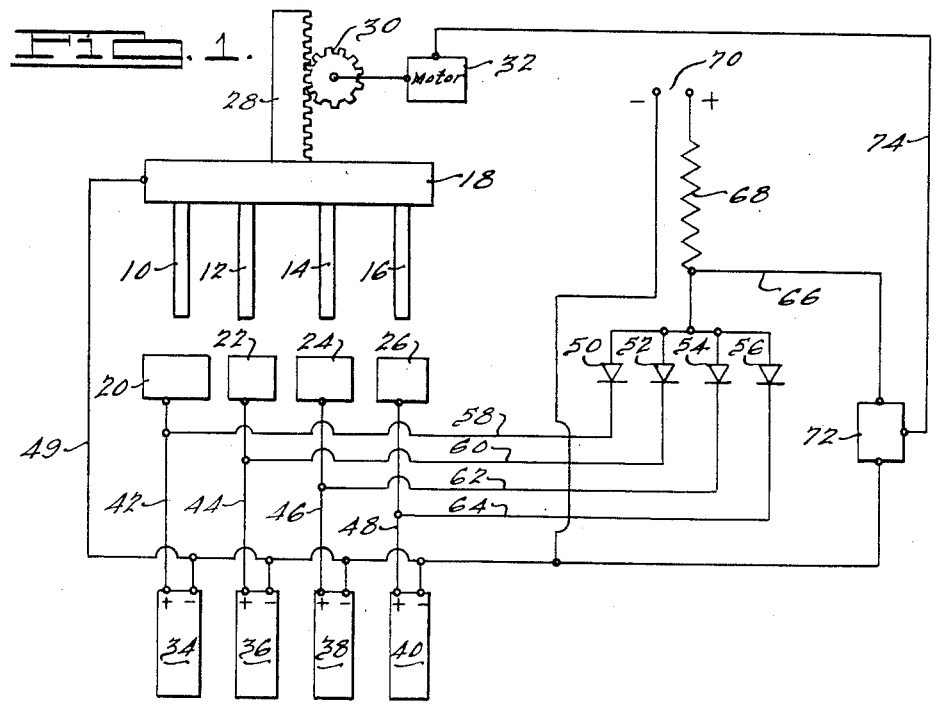
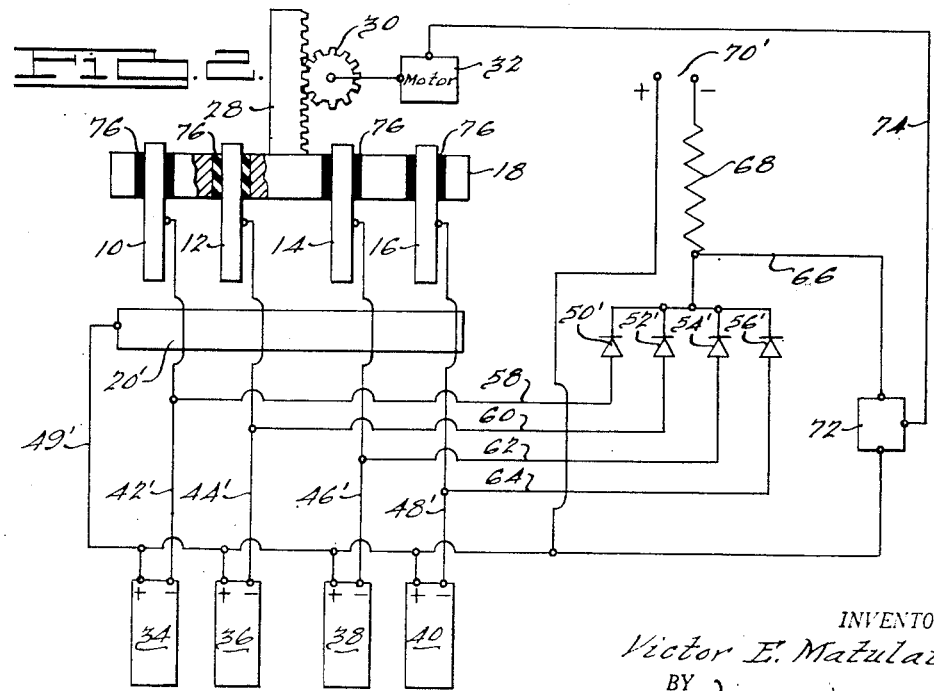
INVENTOR.
Victor E. Matulaitis.
BY
M K Murphy
ATTORNEY.

United States Patent Office 2,783,411
Patented Feb. 26, 1957

2,783,411

SERVO FEED FOR MULTIPLE ELECTRODES

Victor E. Matulaitis, Franklin, Mich., assignor to Elox Corporation of Michigan, Clawson, Mich.

Application December 9, 1955, Serial No. 552,215

14 Claims. (Cl. 314—69)

This invention relates to improvements in the art of arc-machining, sometimes referred to as "spark-machining," "metal disintegrating," and "electrical-discharge-machining."

As arc-machining has been adapted to the solution of an increasing number of problems, the desirability and advantages of simultaneously performing machining operations on a multiplicity of workpieces has been considered, as well as the desirability and advantages of simultaneously performing a number of machining operations on a single workpiece. Attempts to accomplish these ends with known apparatus have not been successful for reasons easily explained.

In the more widely used arc-machining apparatus, the cutting or grinding is carried on automatically by means of an electrode servo-control which responds to average voltage appearing across the arc-gap to feed the electrode toward the work when the voltage tends to increase (i. e. when the gap lengthens) and to retract the electrode when the voltage drops below a preselected value.

It is apparent that should such a control system be used for a set-up using multiple electrodes and a common power supply, one arc-gap would seize control of the servo and the spacing in all of the gaps would be determined by that gap having the shortest length (i. e. the lower voltage) with the result that the other electrodes would not be fed toward the work at a rate sufficient to maintain cutting, it being remembered that the voltage appearing across any gap would be only that of the shortest gap. The result of such an arrangement is that cutting is carried on at only one gap at a time, although it is not always the same gap, and time of machining is unduly prolonged.

When attempts are made to use multiple power supplies with a single servo-control, the condition is not improved because in this instance, control of gap spacing will be seized by the gap having the highest voltage (greatest length) and the electrodes may be fed toward the other workpieces at such a rate that short circuit conditions will exist with consequent damage to the work. Even if no shorting occurred, full power would be effective across the individual gaps and an exceedingly rough finish would result.

I have provided a novel circuit and apparatus whereby a multiplicity of electrodes fed by individual power sources may be controlled by a single servo-feed in such manner that the gap spacing will be controlled by that gap having the lowest average voltage across it, yet cutting will be maintained at all gaps, and desired dimensional accuracy and finish will be had.

The principal object of my invention is to provide means whereby a plurality of individual workpieces can be simultaneously machined by separate electrodes supplied by separate power sources but with the use of a single, automatically controlled power feed mechanism.

Another object is to provide means for simultaneously performing multiple machining operations on a single workpiece with a single, automatically controlled power feed mechanism.

Still another object is to provide means for more rapidly machining workpieces with relatively great power inputs without sacrifice of surface finish and dimensional accuracy.

Other objects and advantages of my invention will become apparent from the following description which, taken in conjunction with the accompanying drawings, discloses preferred forms of the invention.

In the drawings:

Fig. 1 is a schematic representation of an arc-machining circuit embodying my invention.

Fig. 2 is a similar schematic showing of a modified circuit.

Referring to Fig. 1, it may be seen that I have shown schematically a plurality of identical electrodes 10, 12, 14 and 16, mounted on a bar or carrier 18. A plurality of conductive workpieces 20, 22, 24 and 26, are supported in such relationship to the electrodes that the electrodes may be fed toward the workpieces to machine the same by means of electrical discharges across a gap through which a suitable coolant is circulated in accordance with arc-machining practice. It will be understood that the workpieces are supported on the bed of a machine (not shown) and are electrically insulated from one another, and means is provided for maintaining a coolant around the machining area.

The electrode carrier 18 connects the electrodes electrically as well as mechanically and is adapted to be moved toward and away from the workpieces by a quill 28 in conjunction with a pinion 30 driven by a reversible motor 32, the latter members constituting the essential parts of a servo-operated, power-feed system controlled by a servo-control means 72 connected to the motor 32 by a conductor cable 74.

In the interest of clarity and simplicity, a detailed showing and description of the power feed mechanism and control has been omitted, it being deemed sufficient to state that the power feed motor 32 rotates forwardly or reversely in response to the control 72 to raise or lower the electrode carrier 18 and thereby position the electrodes relative to the workpiece.

Power for the respective arc-gaps is supplied by individual power sources 34, 36, 38 and 40. The positive sides of these power sources are connected respectively to the workpieces 20, 22, 24, 26, by the conductors 42, 44, 46, 48, and the negative sides of the power sources are connected to the electrode carrier 18 by the common conductor 49, which is also connected to the servo control means 72. The power sources 34, 36, 38 and 40, are preferably similar to that described and claimed in my copending application, Serial No. 459,703, filed October 1, 1954, and reference is made thereto for a complete description thereof.

The power sources 34, 36, 38 and 40, deliver pulsating D. C. to the respective gaps at varying voltages depending upon gap length, and the servo-mechanism 28, 30, 32 and 72, functions in response to signals received through conductor 49 to maintain optimum preselected gap spacing, such as is described in the aforementioned copending applications. In the case of a single workpiece being machined by a single electrode with a single power source, the optimum gap spacing is preselected by the machine operator by proper adjustment of the apparatus with due regard to type of material being machined, speed and finish desired, etc. Once the machining operation is started, it will proceed to completion automatically under control of the servo-means, the latter functioning to advance the electrode and retract it in accordance with voltage and current values across the gap.

When multiple electrodes are used to machine a plurality of workpieces (or to perform a number of operations on the same piece) as in the present instance, it is, of course, necessary and desirable that the electrode feed be controlled by the gap having the lowest average voltage across it, that gap being the one at which machining is proceeding fastest at the time. However, in order to accomplish the results sought, it is necessary that arcing be maintained across all gaps even though at a higher voltage and at a lower cutting rate. The means for accomplishing this constitutes my invention.

It will be seen in Fig. 1 that I have provided a separate source of voltage 70, the positive terminal of which is connected through a resistor 68 to rectifiers 50, 52, 54 and 56, the other sides of which are connected with the respective workpieces by the conductors 58, 60, 62 and 64. The voltage source 70 must be capable of attaining a magnitude greater than the voltage of any of the power sources 34, 36, 38, 40; thus it will be understood that the respective rectifiers 50–56 will conduct whenever the difference of potential between conductor 66 (which connects one end of resistor 68 with the servo-feed control 72) and any respective one of the conductors 58–64 is positive and will block current flow whenever the potential of any of the conductors is positive with respect to the conductor 66.

The apparatus operates as follows:

Let it be assumed that at some instant in the machining operation, the average voltages across the several gaps are as set forth in Table I, and the relative cutting rates are as shown.

Table I

| Gap | Average gap voltage | Relative metal removal rate, percent |
| --- | --- | --- |
| 10–20 | 20 | 100 |
| 12–22 | 30 | 50 |
| 14–24 | 50 | 0 |
| 16–26 | 25 | 70 |

The control function then will be assumed by the gap 10—20 which has the lowest average gap voltage and the servo-control 72 will control the motor 32 to feed the electrode holder 18 in accordance with conditions existing across gap 10—20. A study of the voltage relationships in Table I in connection with the circuit will show why this must be so.

Rectifier 50 will pass some current from voltage source 70 to gap 10—20 through resistor 68, and the latter is so proportioned that this current flow is relatively small that the cutting operation of the main power supply 34 is not disturbed. The voltage drop in the rectifier is small, in the order of one volt, so the conductor 66 will assume a voltage substantially the same as that of conductor 58. At the same time rectifiers 52, 54 and 56, will block flow of current in their respective circuits because the voltages of conductors 60, 62, 64, are higher than that of conductor 66.

The power feed control 72, then, will "see" the voltage of gap 10—20 and will feed the electrode carrier 18 accordingly.

The discharges across the other gaps will be at higher voltages, and in most instances more stock will be removed with each discharge, but the number of discharges per second will be less so that the rate of stock removal will be correspondingly less. Table I shows a typical condition during machining, but it should be noted that the metal removal rates shown might vary considerably with different materials, different electrode materials, etc.

It will be readily understood, therefore, that with my novel electrode feed control, the time necessary for completing a multiple machining operation will be the time required for the slowest operation and the other cutting operations will lag what would be their optimum cutting rate.

In multiple cutting operations wherein the material being cut is substantially uniform and the holes being cut are of the same size and configuration, the control function may shift from one gap to another, back and forth, throughout the cutting period in accordance with minute variations in gap conditions, the important fact being that the gap with the lowest average difference of potential will always "seize" control of the servo-feed means and cutting will proceed in such manner that all cuts will be made without crowding any particular gap.

In some instances, it is desirable to perform multiple cutting operations on a single workpiece where the openings to be cut vary widely in cross section. In such instances, the control function will almost always remain with one gap throughout, i. e. the gap having the cutting electrode of greatest cross section where the amount of metal removed with each impulse is least, consequently cutting is slowest.

The circuit of Fig. 1 is suitable for simultaneously machining a plurality of workpieces. When it is desired to machine a number of holes in a single workpiece, it is of course necessary to insulate the various power sources from each other. A circuit for accomplishing this is shown in Fig. 2.

In Fig. 2, the electrodes 10, 12, 14, 16, are electrically insulated from each other and from the carrier 18 by insulating collars 76. Conductor 49' connects all of the positive terminals of the power sources 34, 36, 38, 40, with the servo-feed control 72 and with the positive side of the separate power source 70'. The conductors 42', 44', 46' and 48', connect the negative sides of the respective power sources 34, 36, 38, 40, with the individual electrodes. It will be noted also that the rectifiers 50', 52', 54' and 56', are reversed in position. Whereas in the Fig. 1 circuit, the separate voltage source is maintained positive and of higher value than that of the common conductor 49; in the Fig. 2 circuit, the voltage of the source 70' is still of greater magnitude than that of the conductor 49' but is of negative polarity.

The operation of the Fig. 2 circuit is similar to that of Fig. 1, except that the power feed control 72 operates selectively to determine which of the electrodes is at the least negative voltage with respect to the workpiece 20', and this voltage becomes the control for the servo system.

It will thus be seen that I have provided a novel arrangement for arc-machining which permits relatively large amounts of power to be used while maintaining a relatively low level of power at any individual gap. This is advantageous because, in general, the rate of metal removal is roughly proportional to average arc current and, in the example given, if each gap operates at an average current of 25 amperes, the aggregate current delivered by the four power sources would be 100 amperes. If the power sources were paralleled or a single source used and the gaps were connected in parallel, instantaneous currents of 100 amperes could flow across any one gap. This would result in an increase in roughness of cutting because of the high current, and an actual decrease in the average rate of metal removal because of the decreased number of discharges per unit of time. In instances where electrodes of extremely small diameter are used, use of circuits like those shown herein is mandatory.

While I have shown for illustrative purposes only two modifications of my invention and have described them in connection with the machining process sometimes known as "electron drilling," it should be noted that my invention is readily applicable to electrical-discharge grinding, milling, etc.

I claim:

1. In an arc-machining apparatus, a plurality of electrodes, a power source for each electrode, power feed electrodes, a control means for said power feed means having an electrical circuit through the arc-gaps, and means operably associated with said control means for causing said power feed means to respond to the momentary average potential difference across a selected one of said gaps.

2. The combination of claim 1 wherein said last means comprises an additional power source interconnected with said gaps and with said power feed control means and means operable automatically to permit current from said additional power source to flow only across the said selected gap.

3. In an arc-machining apparatus, a plurality of electrodes, a power source for each electrode, power feed means for simultaneously adjusting the positions of said electrodes, a control means for said power feed means having an electrical circuit through the arc-gaps, and means operably associated with said control means for causing said power feed means to respond to the momentary average potential difference of the gap having the lowest potential difference.

4. The combination of claim 3 wherein said last means comprises an additional power source interconnected with said gaps and with said power feed control means and means operable automatically to permit current from said additional power source to flow only across the gap having the lowest average potential difference.

5. In an arc-machining apparatus, a plurality of electrodes, an individual power source for each electrode, means mounting said electrodes for simultaneous adjustment relative to the work being machined, a power feed means for adjusting said electrodes, control means for said power feed means operably associated with said electrodes, said power sources and work such that said electrodes are adjusted automatically in response to predetermined voltage conditions existing in the arc-gaps, and means operatively associated with said control means for rendering said control means responsive only to voltage conditions existing in one of said gaps.

6. The combination of claim 5 wherein said last means comprises an additional power source interconnected with said arc-gaps and said control means and blocking means associated therewith operable to permit current flow from said additional power source to a selected gap only.

7. The combination of claim 6 wherein said blocking means comprises rectifiers connected between said additional power source and said respective arc-gaps.

8. In an arc-machining apparatus, a plurality of electrodes, an individual power source for each electrode, means mounting said electrodes for simultaneous adjustment relative to the work being machined, a power feed means for adjusting said electrodes, control means for said power feed means operably associated with said electrodes, said power sources and work such that said electrodes are adjusted automatically in response to predetermined voltage conditions existing in the arc-gaps, and means operatively associated with said control means for rendering said control means responsive only to voltage conditions existing in that gap having the lowest average difference of potential.

9. The combination of claim 8 wherein said blocking means comprises a rectifier connected between each individual power source and said additional power source.

10. In an arc-machining apparatus, a plurality of electrodes, a power source for each electrode, a power feed means operable to advance and retract said electrodes simultaneously, said feed means having an electric control circuit connected with said power sources such that current in said control circuit must flow through one or another of the arc-gaps, an additional power source having a voltage magnitude greater than that of any of the electrode power sources, circuit means connecting said additional power source in parallel across the arc-gaps and control circuit.

11. In an arc-machining apparatus, a plurality of electrodes, a power source for each electrode, a power feed means operable to advance and retract said electrodes simultaneously, said feed means having an electrical control circuit connected with said power sources such that current in said control circuit must flow through one or another of the arc-gaps, an additional power source having a voltage magnitude greater than that of any of the electrode power sources, circuit means connecting said additional power source in parallel across the arc-gaps and control circuit, said circuit means including rectifiers connected between said additional power source and said respective electrode power sources whereby current flow is unidirectional.

12. The combination set forth in claim 11 wherein the negative terminals of said power sources are connected with each of said electrodes.

13. The combination set forth in claim 11 wherein the positive terminals of said power sources are connected to the workpiece.

14. The combination set forth in claim 11 wherein said electrodes are insulated from one another and each electrode is connected to the negative terminal of its respective power source.

References Cited in the file of this patent

UNITED STATES PATENTS

| | | |
|---|---|---|
| 493,359 | Hunter | Mar. 14, 1893 |
| 2,640,947 | Journeaux | June 2, 1953 |
| 2,721,292 | Lobbe | Oct. 18, 1955 |